Figure 2:

(Model.)
A. D. T. WHITNEY.
ALPHABET BLOCKS.
No. 257,630. Patented May 9, 1882.
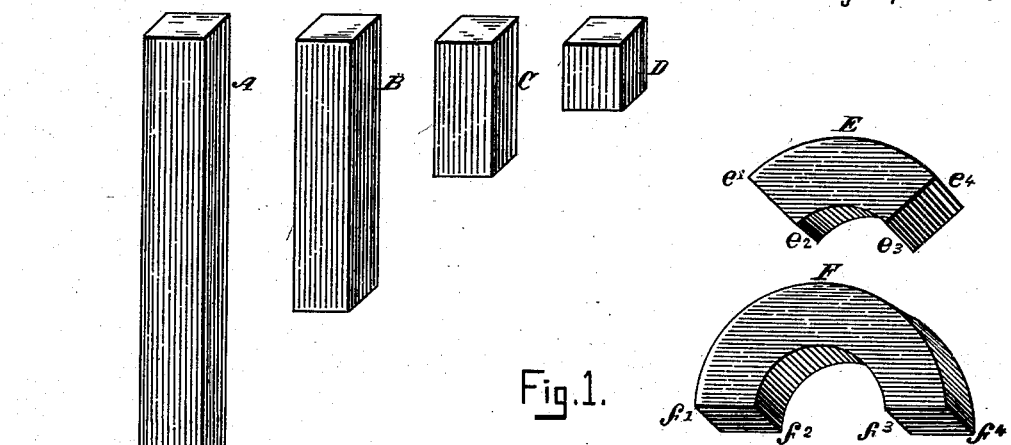
Fig. 1.
Witnesses:
M. Bessie de Veber
Charles Brown
Inventor.
Adeline D. T. Whitney
N. PETERS, Photo-Lithographer, Washington, D. C.

(Model.) 2 Sheets—Sheet 2.

A. D. T. WHITNEY
ALPHABET BLOCKS.

No. 257,630. Patented May 9, 1882.

UNITED STATES PATENT OFFICE.

ADELINE D. T. WHITNEY, OF MILTON, MASSACHUSETTS.

ALPHABET-BLOCKS.

SPECIFICATION forming part of Letters Patent No. 257,630, dated May 9, 1882.

Application filed December 6, 1881. (Model.)

*To all whom it may concern:*

Be it known that I, ADELINE D. T. WHITNEY, of Milton, in the county of Norfolk and State of Massachusetts, have invented a new and useful Set of Alphabet-Blocks, of which the following is a specification, reference being therein had to the accompanying drawings, which are made a part thereof—

Figure 1 showing the blocks in perspective and illustrating their use, and Fig. 2 further illustrating their use.

My invention consists in making the various blocks of a set of alphabet or toy blocks of such shape and relative proportion as to represent various proportional subdivisions of a straight line of given length, and of a circle whose diameter bears a certain proportion to the given straight line, and so that they are capable of representing by combination with each other the different letters of the alphabet, the various numerals, and other figures or characters commonly used in print in regular proportion and on a uniform scale.

The child or learner using the blocks, instead of selecting a block representing in itself a completed letter or character, as with the alphabet-blocks in common use, may be furnished with or may select the blocks of this set which together represent the desired letter or character, and may then construct it for himself.

The blocks are of six different kinds, which are shown in perspective in Fig. 1 of the drawings, and are there lettered respectively A, B, C, D, E, and F. They may be made of wood or of any convenient material, and they may be of any convenient shape so long as they bear to one another the proportions herein set forth. They are of uniform breadth and of uniform thickness, and it will be found convenient to make their breadth and thickness equal. The block A represents the straight line of given length to be subdivided, and is a rectangular parallelogram in shape, outline, or longitudinal section, whose length is eight time its breadth.

The blocks B, C, and D are similar in all respects to the block A, except that the length of B is one-half, that of C one-quarter, and that of D one-eighth the length of A. Since the breadth of A and of all the other blocks is one-eighth the length of A, the block D, whose length is also one-eighth that of A, will be a square in shape, and if the breadth and thickness of all the blocks be made equal the block D will be a cube. The sides $c'$ $e^2$, $e^3$ $e^4$ of the block E and the sides $f'$ $f^2$, $f^3$ $f^4$ of the block F, being the breadth of the blocks E and F, are all equal and all equal to the common breadth of all the blocks and to the sides of the square D. The remaining sides, $e^2$ $e^3$, $e'$ $e^4$, of the block E and $f^2$ $f^3$, $f'$ $f^4$ of the block F are parts of the circumferences of circles whose radii differ in length by the common breadth of all the blocks or by the length of the sides of the square D, but have a common center for each block E or F. The sides last above named of E are one-quarter and of F one-half the entire circumference of their respective circles. The radius of the sides $e^2$ $e^3$ and $f^2$ $f^3$ is equal to the common breadth of all the blocks or to the sides of D, as above, and the radius of the sides $e'$ $e^4$, $f'$ $f^4$ is twice that length. The blocks E and F thus represent quarters and halves, respectively, of a circle whose diameter is one-half the length of A or the given straight line.

A set consisting of two blocks like A, four like B, four like C, four like D, four like E, and two like F, or of twenty blocks in all, will be found sufficient for the representation, in regular proportion and on a uniform scale, of each of the letters of the alphabet, both capital and small, each of the Arabic numerals, and of the Roman numerals, except those which require extended repetitions, and all, or nearly all, of the other characters commonly used in print, all as shown in the remaining figure of the drawings after Fig. 1, above referred to.

By using a set composed of a greater number of blocks of course more of the above letters and characters can be simultaneously represented. With a less number than above stated of each of the six different kinds of blocks above described the entire succession of various characters above mentioned cannot be accurately and conveniently formed.

What I claim as my invention, and desire to secure by Letters Patent, is—

1. A set of blocks representing the various proportional subdivisions of a given straight line and proportional arcs of a circle whose diameter bears a fixed ratio to the given line and capable by means of interchangeable combinations of representing the letters of the Roman alphabet and other printed characters, substantially as described.

2. A set of alphabet or toy blocks composed of blocks representing different proportional subdivisions of a given straight line and circle, each in definite relative proportion to the others and capable of representing by combination the various characters commonly used in print in regular proportion and on a uniform scale, substantially as described.

3. The blocks A, B, C, D, E, and F, having the shapes and relative proportions and capable of being used in combination, in the manner and for the purposes herein set forth.

ADELINE D. T. WHITNEY.

Witnesses:
EDWARD S. DODGE,
FREDERIC DODGE.